United States Patent [19]
Leidig

[11] 3,789,929
[45] Feb. 5, 1974

[54] THREE WHEEL ALL WHEEL HYDRAULIC DRIVE TRACTOR

[76] Inventor: Raymond H. Leidig, Rt. 3 Box 504, Lake Charles, La. 70601

[22] Filed: Mar. 29, 1972

[21] Appl. No.: 239,119

[52] U.S. Cl. ............................ 172/798, 180/26 A
[51] Int. Cl. .................................... E02f 3/12
[58] Field of Search ... 172/781, 780, 300, 301, 273, 172/787, 798; 180/26 A, 27

[56] References Cited
UNITED STATES PATENTS

| | | | |
|---|---|---|---|
| 2,942,677 | 6/1960 | Gray | 180/26 A |
| 3,658,137 | 4/1972 | Seymour | 172/300 |
| 3,527,315 | 9/1970 | Hampton | 172/781 |
| 2,818,125 | 12/1957 | Vogelaar | 180/27 X |
| 3,695,374 | 10/1972 | Commons | 180/27 |
| 1,868,122 | 7/1932 | Tharp | 172/781 X |
| 3,704,754 | 12/1972 | Layton | 172/786 X |

*Primary Examiner*—Stephen C. Pellegrino

[57] ABSTRACT

A three wheel all wheel hydraulic drive tractor in which the single wheel is steerable and all wheels tilt about a longitudinal axis for maintaining the stability of the tractor. A bulldozer blade and a grader blade are each fixed to the tractor for vertical and tilting adjustment as well as transverse tilting adjustment. All adjustments are hydraulically made and an internal combustion engine drives a hydraulic pump to power the adjusting cylinders and the hydraulic power motors. The power motors are mounted within each of the wheels within the rim thereof.

2 Claims, 7 Drawing Figures

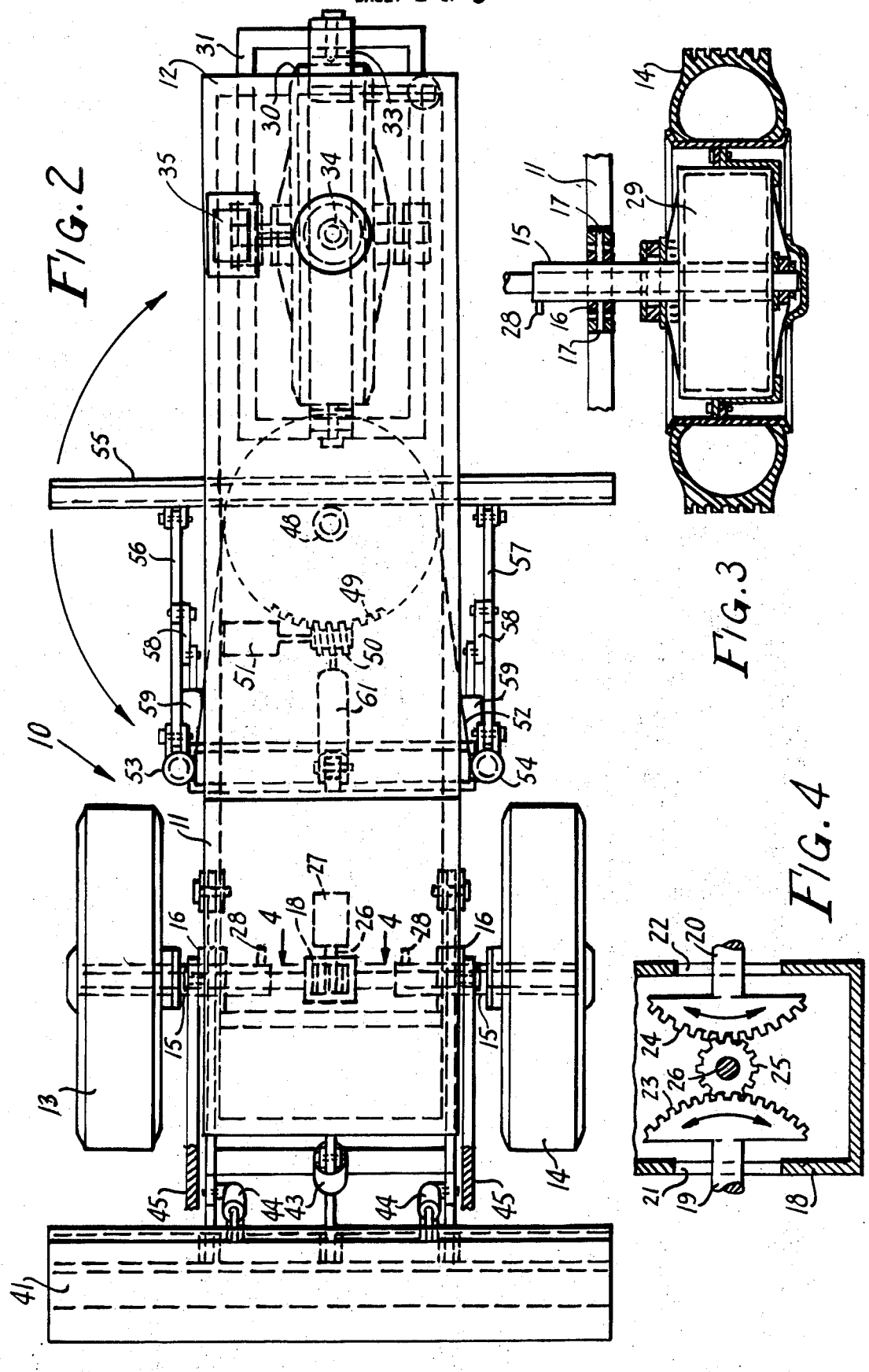

THREE WHEEL ALL WHEEL HYDRAULIC DRIVE TRACTOR

BACKGROUND OF THE INVENTION

FIELD OF THE INVENTION

The present invention relates to three wheel tractors in which each of the wheels is individually hydraulically driven.

SUMMARY OF THE INVENTION

A three wheel tractor in which the singel wheel is steerable and all wheels tilt about a longitudinal axis for the facility of the tractor. Each of the wheels has a hydraulic drive motor contained therein. A bulldoxer blade and a grader blade are secured to the tractor frame for normal adjustment will all adjustments being made hydraulically. A prime mover and hydraulic pump are provided on the tractor frame to power all of the adjusting cylinders and the hydraulic motors to provide the power for the tractor.

The primary object of the invention is to provide a completely adjustable three wheel hydraulically driven tractor having bulldozer and grader blade attachments thereto.

Other objects and advantages will become apparent in the following specification when considered in the light of the attached drawings.

BRIEF DESCRIPTION OF THE DRAWINGS

FIG. 2 is a top plan view of the invention shown partially broken away and in section for convenience of illustration;

FIG. 3 is an enlarged fragmentary horizontal sectional view taken along the line 3—3 of FIG. 1 looking in the direction of the arrows;

FIG. 4 is an enlarged fragmentary cross-section taken along the line 4—4 of FIG. 2 looking in the direction of the arrows;

DESCRIPTION OF THE PREFERRED EMBODIMENT

Figure 1:
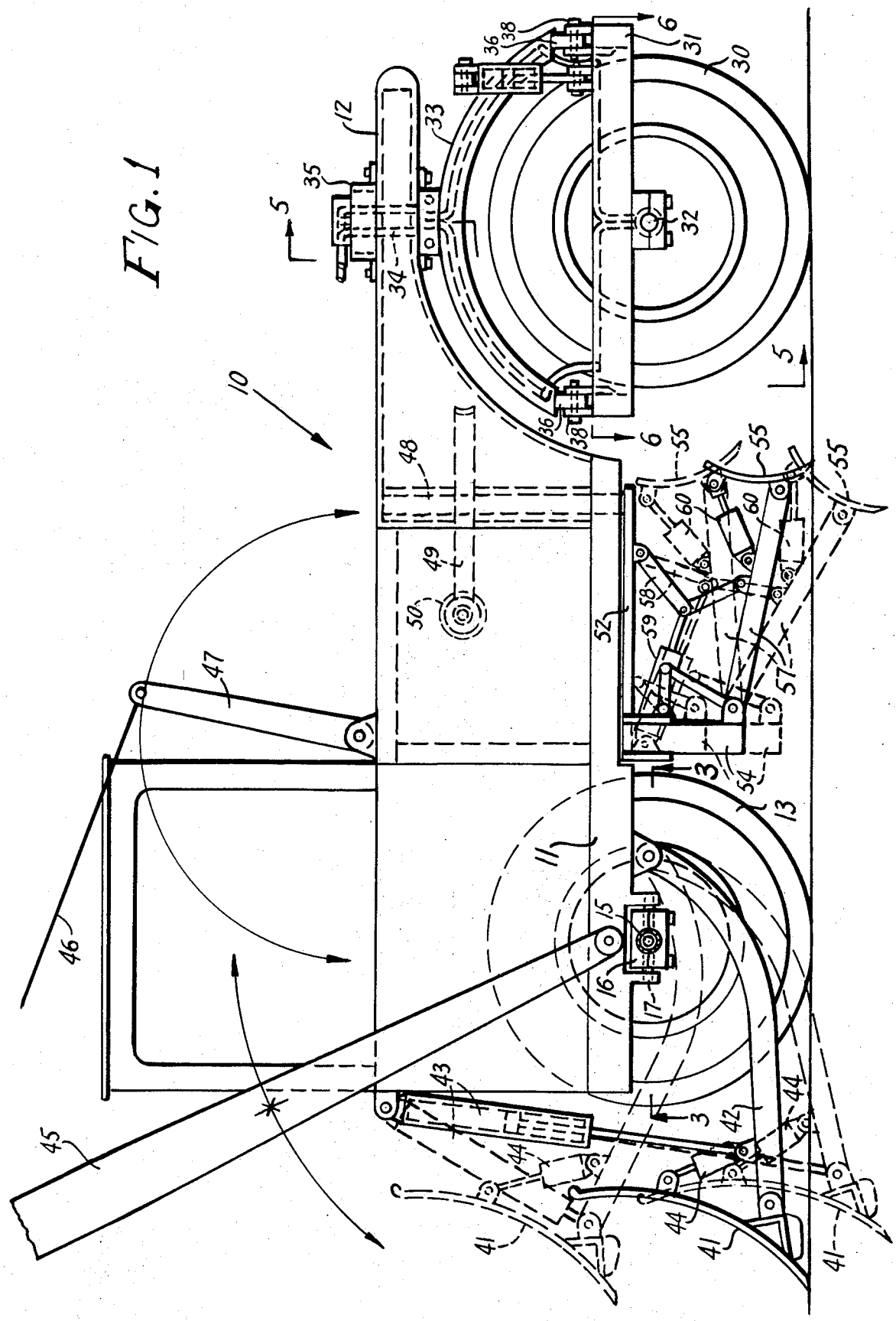
FIG. 1 is a side elevation of the invention.

Referring now to the drawings in detail wherein like reference characters indicate like parts throughout the several figures the reference numeral 10 indicates generally a tractor constructed in accordance with the invention.

The tractor 10 includes a generally horizontal frame 11 having a horizontal upwardly offset front frame 12 rigidly secured thereto. A pair of rear wheels 13, 14 are arranged under the rear of the frame 11 and each has a tubular housing 15 mounted in pivot blocks 16 for pivotal movement about a longitudinal shaft 17. A housing 18 is positioned intermediate the opposite sides of the frame 11 and supported thereon. The housing 18 has a non-rotating shaft 19 extending inwardly thereof from the wheel 14 and a non-rotating shaft 20 extending inwardly thereof from the wheel 13. The shafts 19, 20 extend through vertically elongate openings 21, 22 in opposite sides of the housing 18. An arcuate gear segment 23 is rigidly secured to the shaft 19 and an identical arcuate gear segment 24 is rigidly secured to the shaft 20. A spur gear 25 is positioned in the housing 18 carried by a shaft 26 and meshes with the arcuate gear segments 23, 24 as can be seen in FIG. 4. A rotary hydraulic motor 27 is secured to the shaft 26 to rotate the spur gear 25 to tilt the shafts 19, 20 about the pivot shaft 17.

The housings 15 are fitted with hydraulic inlet and outlet pipes 28 for connecting the hydraulic drive motors 29 in the wheels 13, 14 to a source of hydraulic fluid under pressure. The hydraulic motor 29 is more fully described in my co-pending application entitled RIM POWER HYDRAULIC MOTOR POWER WHEEL, filed Mar. 22, 1972, Ser. No. 237,036.

The forward end of the tractor 10 is supported on a single front wheel 30 which is carried by a generally rectangular subframe 31 on a shaft 32 extending transverse thereacross. The wheel 30 has a hydraulic motor 29 mounted therein identical to the hydraulic motor 29 which drives the rear wheels 13, 14.

Figure 5:
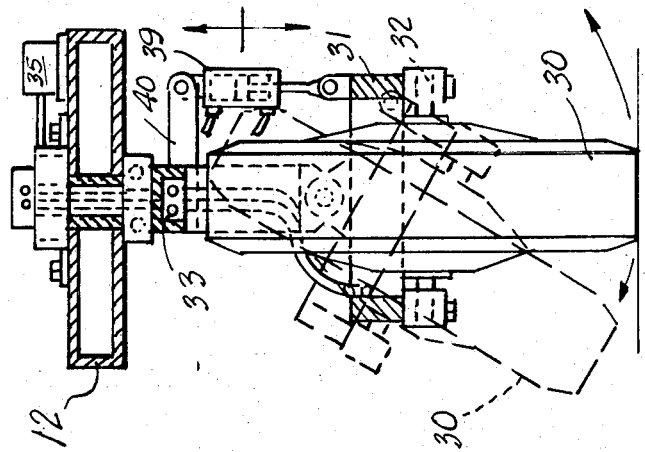
FIG. 5 is an enlarged fragmentary transverse sectional view taken along the line 5—5 of FIG. 1 looking in the direction of the arrows.
Figure 6:
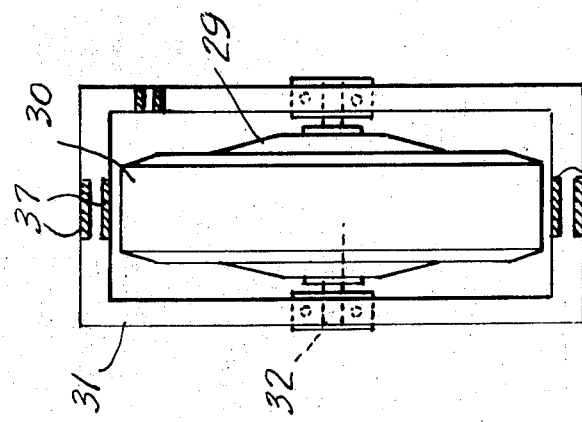
FIG. 6 is a horizontal sectional view taken along the line 6—6 of FIG. 1 looking in the direction of the arrows.

A generally U-shaped fork 33 is mounted on a pivot pin 34 journaled in the front frame 12 to permit the fork 33 to rotate about a vertical axis. The hydraulic motor 35 mounted on the frame 12 rotates the fork 33. An ear 36 is formed on each end of the fork 33 and projects downwardly between a pair of ears 37 on the subframe 31. Longitudinally extending pivot pins 38 pivotally secure the ears 36 to the ears 37 to permit the subframe 31 to pivot about the longitudinal axis as can be seen in FIG. 5.

A hydraulic arm 39 extends between the subframe 31 and an arm 40 secured to the fork 33. Actuation of the hydraulic ram 39 tilts the subframe 31 about the pivot pins 38 to tilt the wheel 30 as required by the terrain over which the tractor 10 is travelling.

A bulldoxer blade 41 is positioned at the rear of the tractor 10 and pivotally supported on a pair of arms 42 which are pivotally mounted to the frame 11. A hydraulic ram 43 supports the center of the bulldozer blade 41 and raises and lowers the blade 41 as required. A pair of hydraulic rams 44 are secured on opposite sides to the arms 42 and to the bulldozer blade 41 to tilt the bulldozer blade 41 about a transverse pivot.

A pair of arms 45 are pivotally secured to opposite sides of the frame 11 and extend rearwardly and upwardly therefrom to provide an A-frame derrick. A cable or rigid connection 46 extend from an operating arm 47 on the tractor 10 to the upper ends of the arms 45 to move the arms 45 up and down as required. A hydraulic motor (not shown) is provided for rotating the operating arm 47 to actuate the derrick.

A vertical shaft 48 is journaled for rotation in the frame 11 and has a large spur gear 49 rigidly secured thereto, A worm gear 50 meshes with the spur gear 49 and is carried by a rotary hydraulic motor 51 to hydraulically rotate the spur gear 49 and the shaft 48. A plate 52 is carried on the lower end of the shaft 48 and has a pair of depending arms 53, 54 secured to the rear outside corners thereof. A transverse grader blade 55 is positioned slightly forwardly of the shaft 48 and is mounted on a pair of arms 56, 57 which are pivotally secured to the lower edge of the blade 55 at one end and are pivotally secured to the lower end of the arms 53, 54 at the other end. A pair of links 58 are secured to the arms 56, 57 at one end and to the plate 52 at the other end and the hydraulic ram 59 is connected to the juncture of the pair of links 58 so that actuation thereof will move the arms 56, 57 upwardly and downwardly with respect to the frame 11 raising and lowering the grader blade 55. A hydraulic ram 60 is connected between the arms 56, 57 and the top of the grader blade 55 to tilt the grader blade 55 about a horizontal transverse pivot. A hydraulic ram 61 extends from the plate 52 to the forward ends of the arms 56, 57 to raise and lower the grader blade 55 with respect to the frame 11.

Figure 7:
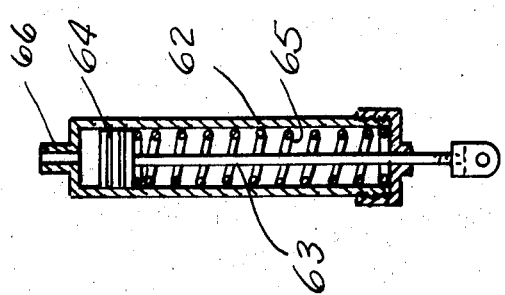
FIG. 7 is a sectional view through one of the actuating cylinders.

In FIG. 7 the hydraulic ram 62 includes a piston rod 63, piston 64 connected thereto and a coil spring 65 for normally urging the piston 64 upwardly therein. A connection 66 is provided for admitting hydraulic fluid to the hydraulic ram 62 to force the piston 64 downwardly against the tension of the spring 65. The hydraulic ram 62 may be used at any point in the tractor 10 where hydraulic pressure in one direction only is required and a spring return is effective in completing the function of the hydraulic ram.

A conventional prime mover is used in the tractor 10 for driving a conventional hydraulic pump to power each of the hydraulic rams and the hydraulic motors used in actuating and controlling the tractor 10. A specific prime mover and hydraulic pump have not been illustrated since these are of conventional design and construction.

Having thus described the preferred embodiment of the invention it should be understood that numerous structural modifications and adaptations may be resorted to without departing from the spirit of the invention.

I claim:

1. A three wheel tractor including a generally horizontal frame, an upwardly offset front frame rigidly secured to the front portion of said horizontal frame, a pair of wheels secured to support the rear portion of said horizontal frame, a generally rectangular normally horizontal front wheel frame, a single wheel encompassed by said front wheel frame and journalled therein, means connecting said front wheel frame to said front frame for supporting said horizontal frame, said last named means connecting said front wheel frame for; tilting adjustment about a horizontal longitudinal pivot and for; steering rotation about a vertical pivot, power means on said means connecting said front wheel frame to said front frame for tilting said front wheel frame, power means on said front frame for rotating said front wheel frame for steering said tractor, means mounting said rear wheels for tilting movement about a horizontal longitudinal pivot, a hydraulic motor contained within each of said wheels for rotating said wheels, a grader blade mounted on said tractor intermediate the opposite ends thereof, and means on said tractor for pivoting said grader blade about a vertical axis and additional means on said grader blade for pivoting said grader blade about a horizontal axis to control the grading position of said blade.

2. A device as claimed in claim 1 including power means on said horizontal frame for tilting said rear wheels.

* * * * *